United States Patent

Marze

[15] 3,676,326

[45] July 11, 1972

[54] CATION EXCHANGE MEMBRANES

[72] Inventor: Xavier Marze, Lyon, France

[73] Assignee: Rhone-Poulenc S.A., Paris, France

[22] Filed: July 17, 1969

[21] Appl. No.: 842,718

[30] Foreign Application Priority Data

July 18, 1968 France..................................68159720

[52] U.S. Cl............................................204/296, 204/180 P
[51] Int. Cl.............................................B01k 3/10
[58] Field of Search......................................204/180 P, 296

[56] References Cited

UNITED STATES PATENTS 3,388,080  6/1968  deKörosy..........................204/296 X
3,275,575  9/1966  Fogle..................................204/296 X

FOREIGN PATENTS OR APPLICATIONS

40/21157  1965  Japan

OTHER PUBLICATIONS

Chem. Abs. 64: 8417h 1966
Chem. Abs. 53: 9519d 1961

Primary Examiner—John H. Mack
Assistant Examiner—R. J. Fay
Attorney—Cushman, Darby & Cushman

[57] ABSTRACT

The invention provides cation exchange membranes made from sulphated ethylene-vinyl alcohol copolymers and a process for the preparation thereof.

5 Claims, No Drawings

CATION EXCHANGE MEMBRANES

The present invention relates to cation exchange membranes derived from ethylene-vinyl alcohol copolymers and to processes for their preparation.

Ion exchange membranes have acquired a considerable industrial importance because they offer a possible solution to many problems, particularly in the desalination of salt water and other saline liquids and in the manufacture of certain fuel cells.

The properties required in membranes for use in the electrodialysis of saline solutions include principally low electrical resistance, high selective permeability (ability preferentially to exchange one ion rather than another) and low solvent transfer (quantity of solvent crossing the membrane for a given quantity of salt exchanged). When the membranes are used in other ways some or all of these properties are generally required.

The present invention provides cation exchange membranes which have valuable properties in electrodialysis as well as other properties such as insolubility in both water and the common solvents, resistance to alkaline reagents, good mechanical properties, flexibility even in the dry state, and no adhesive ability.

The cation exchange membranes of the present invention comprise a copolymer of formula:

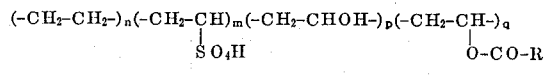

I wherein R is a hydrocarbon radical, $n$, $m$ and $p$ are positive integers and $q$ is a positive integer or O and $n/m+p$ is 4.5 to 60 and $q/m+p+q$ is less than 0.1 R is preferably a lower alkyl radical containing 1 to 4 carbon atoms such as methyl and the ratio of $n$ to $m+p$ and of $q$ to $m+p+q$ are preferably 5.5 to 18 and below 0.04 respectively.

The membranes of this invention may be prepared by treating a film of a binary ethylene-vinyl alcohol copolymer and/or a ternary ethylene-vinyl alcohol-vinyl ester copolymer in which the ratio of ethylene/hydroxyethylene units is 4.5:1 to 60:1, preferably 5.5:1 to 18:1, with one or more of sulphuric acid, oleum, chlorosulphonic acid, sulphur trioxide and the addition products of sulphur trioxide and a base.

The film is treated in a sulphuric bath, i.e., a liquid medium containing one or more of sulphuric acid, oleum, chlorosulphonic acid (ClSO$_3$H), sulphur trioxide, and the addition products of sulphur trioxide and bases, and optionally up to 95 percent, preferably less than 85 percent by weight of the total weight of the bath of a solvent.

Many diverse solvents may be used and they may even react with the sulphuric compound such as acetic acid which at least partially forms acetyl sulphate in the presence of chlorosulphonic acid. There are however some combinations of solvent and sulphuric compound which may not be used because the latter is then rendered useless for example water and chlorosulphonic acid.

The solvents which may be used, include liquid SO$_2$, monocarboxylic acids containing 1 to 10 carbon atoms, chlorinated aliphatic hydrocarbons, such as chloroform, carbon tetrachloride and tetrachloroethylene, ethers and carbon disulphide.

When the sulphuric compound used is the addition product of SO$_3$ and a base, the solvent used can also be an excess of the base, for example a tertiary nitrogen base such as pyridine or a picoline, or a phosphine oxide, dioxane, or an unsubstituted or chlorinated aliphatic or aromatic hydrocarbon.

When sulphuric acid is used, the solvent used may also be water (in small amount) or a hydrocarbon.

The binary ethylene-vinyl alcohol copolymer and/or the ternary ethylene-vinyl alcohol-vinyl ester copolymer are hereinafter referred to as the ethylene-alcohol copolymer. Preferred ethylene-alcohol copolymers have a melt index (measured according to Standard ASTM D 1238 – 52 T) of less than 500 after complete acetylation.

The ethylene-alcohol copolymer films are obtained by known methods. Usually, an ethylene-alcohol copolymer is first prepared by the complete or partial saponification of an ethylene-vinyl ester copolymer and the ethylene-alcohol copolymer thus obtained is then formed into a film.

The type of the vinyl ester in the ethylene-vinyl ester copolymer used in the saponification is not critical, and may for example be vinyl formate, acetate, propionate, butyrate, stearate, benzoate, cyclohexanoate, isobutyrate, palmitate, myristate, toluate, naphthoate, campholate, acrylate or chloracetate. However, it is generally preferable to use the acetate.

It is of advantage to saponify the ethylene-vinyl ester copolymer until an ethylene-alcohol copolymer having a ratio of hydroxyethylene/hydroxyethylene + acyloxyethylene, units greater than 0.90 and preferably greater than 0.96 is obtained.

Ethylene-alcohol copolymers are usually formed into a film by pressing when hot, or by casting the solution followed by evaporation. Cold hexamethylphosphotriamide, hot aromatic hydrocarbons such as benzene, toluene or xylene, or polar solvents such as dimethylformamide can for example be used as solvents in this casting. Films can be made of various thicknesses but they are usually 0.05 to 1 mm. thick.

Finally, to improve the mechanical properties of the membranes of this invention it is often advantageous to reinforce the ethylene-alcohol copolymer film by incorporating a reinforcing support, such as a screen, grid or woven fabric, into it during its preparation.

Using these techniques and in particular by casting the solution it is possible to prepare films of different geometric shapes, for example bag or tube form. However the membranes prepared are in general flat.

Treating the ethylene-alcohol copolymer film in a sulphuric bath in the process of this invention consists in practice of immersing the film in the bath and allowing it to remain under these conditions until the required number of acid groups have become attached.

The required number of groups depends on the intended use of the membrane but there are usually 0.5 to 4 preferably 1 to 2.5, milliequivalents of -SO$_4$H groups per gram of dry membrane.

The film is generally treated in the sulphuric bath at a temperature of 20° C. to 120° C. and preferably of 40° C. to 90° C.

The treatment time varies within wide limits depending on the desired degree of acidity of the membrane and on the temperature of treatment and above all on the composition of the sulphuric bath. Very short treatment times make it difficult to control the reaction and the reproducibility of the membranes and very long treatment times are of no value for economic reasons. Normally the treatment lasts for 10 minutes to 15 hours, preferably for 1 to 8 hours.

The treating of the ethylene-alcohol copolymer film in the sulphuric bath can be carried out continuously in the case of indefinitely long membranes, or discontinuously in other cases. This may be followed by various washing operations to eliminate particularly the non-macromolecular material in the membrane.

The membranes of this invention can either be used as such or else they can be further treated with a bleaching agent, such as an aqueous alkaline solution containing active chlorine, thus improving their electro-chemical properties and in particular lowering their electrical resistance. The composition of the bleaching agent is not critical as the electrical resistance of the membrane is lowered by contact with any aqueous solution containing OH$^-$ and ClO$^-$ ions. In practice the membrane is treated with the bleaching agent until it has a constant electrical resistance, which may readily be determined by measurements on samples of the membranes.

The treatment of the membrane with a bleaching agent can be carried out with heating, but it is in general preferable to work at ambient temperature to avoid deterioration in the mechanical properties of the membrane. The treatment of the membrane with a bleaching agent can be followed by various washing operations.

The following Examples illustrate the invention.

The properties of the prepared membranes were determined by carrying out the following measurements.

a. Degree of Acidity (expressed in milliequivalents per gram of dry material).

This is determined by neutralization with an alkali solution of known strength.

b. Electrical Substitution Resistance (i.e. the change for a given membrane surface in the electrical resistance of a liquid cylinder in a direction perpendicular to the axis of the cylinder when the membrane is substituted for a slice of liquid of the same thickness and of the same surface as the membrane).

In the present case the substitution resistance is measured in an aqueous solution of 0.6 M KCl and is expressed in $\Omega - cm^2$.

c. Selective Permeability (i.e. the ability of the membrane to prevent the passage of cations while allowing that of anions.

The selective permeability is calculated from a measurement of the electromotive force, E, between an 0.4 and an 0.8 M aqueous solution of KCl separated by the membrane in question, which has previously been saturated with an 0.6 M aqueous solution of KCl.

The formula used to calculate the selective permeability, P, as a percentage is:

$$\frac{P}{100} = \frac{\bar{t}^+ - t^+}{1 - t^+}$$

in which $t^+$ is the transport number of $K^+$ in an aqueous solution of 0.6 M KCl and $\bar{t}^+$ the transport number of $K^+$ in the membrane.

$\bar{t}^+$ is calculated using the formula:

$\bar{t}^+ = (E = E0)/2\ Eo$ in which $Eo = (RT/F)\ ln\ (a1/a2)$ where E is the electromotive force between the 0.4 M and the 0.8 M aqueous solution of KCl, R is the gas constant, T is the absolute temperature, F is one Faraday (96,489 coulombs per gram equivalent, a1 is the activity of the more concentrated electrolyte (calculated from the concentration of the electrolyte and the activity coefficient) and a2 is the activity of the less concentrated electrolyte.

d. Water Transfer (only measured in Examples 5 and 19).

The amount of water which has migrated across a membrane dividing a cell into two compartments, one compartment containing pure water, the other containing an aqueous solution of 1.2 M KCl, is measured. This water transfer is expressed in $mm^3$ per hour per $cm^2$ of membrane for a difference of 1 mol/liter between the concentrations of the two solutions.

EXAMPLES 1 to 20

A series of experiments to prepare membranes corresponding to formula (I) is carried out by the following general method:

An ethylene-vinyl acetate copolymer is saponified to a degree of saponification greater than 95 percent. The ethylene-alcohol copolymer obtained is hot pressed into a film (except in Examples 4 and 20 where a hot solution of the ethylene-alcohol copolymer in xylene was cast and the solvent then evaporated). The thickness of the prepared film is 0.2 mm (except in Example 1 where it is 0.1 mm).

The film is immersed in a hot sulphuric bath consisting of a 23 percent by weight solution of chlorosulphonic acid in acetic acid.

After reaction, the membrane obtained is washed with successive aqueous solutions of sulphuric acid of concentration decreasing from 70 percent to 0 percent (pure water) by weight.

In Examples 8 and 15, membranes prepared according to Examples 7 and 14 respectively were treated in addition with sodium hypochlorite. This was done by leaving the membranes for 24 hours at 20° C. in a solution of sodium hypochlorite of about 48 chlorometric degrees (commercial concentrated bleach solution containing 2.14 moles of sodium hypochlorite per liter).

The conditions of the preparation of the membranes used in each Example and the results obtained in each case are shown in the following Table:

| Example | Ethylene/vinyl alcohol molecular ratio | Melt index of the completely acetylated ethylene/alcohol copolymer | Immersion time of film (hours) | Sulphuric bath temperature (° C.) | Special features of preparation | Degree of acidity of the membrane meq./g. of dry resin | Substitution resistance of the membrane ($\Omega cm.^2$) | Selective permeability (percent) |
|---|---|---|---|---|---|---|---|---|
| 1 | 6.2 | 25 | 5 | 60 | | 1.9 | 0.3 | 48 |
| 2 | 6.2 | 25 | 6 | 60 | | 1.9 | 1 | 68 |
| 3 | 6.2 | 25 | 7 | 50 | | 1.15 | 7 | 80 |
| 4 | 7.9 | 150 | 4 | 65 | Film obtained by casting | | 6 | 82 |
| 5 | 7.9 | 150 | 4 | 65 | | 1.7 | 7 | 79 |
| 6 | 7.9 | 150 | 7 | 60 | | 1.3 | 4.3 | 79 |
| 7 | 7.9 | 25 | 4 | 65 | | 1.3 | 13 | 89 |
| 8 | 7.9 | 25 | 4 | 65 | Membrane treated with NaClO | | 6 | 83 |
| 9 | 7.9 | 25 | 3 | 70 | | 1.6 | 3 | 84 |
| 10 | 7.9 | 15 | 2½ | 70 | | | 1 | 79 |
| 11 | 7.9 | 15 | 3 | 70 | | 1.7 | 5 | 87 |
| 12 | 7.9 | 15 | 4 | 70 | | | 6 | 87 |
| 13 | 7.9 | 15 | 7 | 65 | | 1.4 | 6.5 | 84 |
| 14 | 7.9 | 6 | 4 | 65 | | 1.2 | 37 | 95 |
| 15 | 7.9 | 6 | 4 | 65 | Membrane treated with NaClO | | 13 | 90 |
| 16 | 7.9 | 6 | 4½ | 65 | | 1.4 | 4 | 86 |
| 17 | 7.9 | 6 | 5 | 65 | | 1.5 | 2.5 | 83 |
| 18 | 9.2 | 400 | 2½ | 70 | | 1.2 | 5 | 79 |
| 19 | 9.2 | 2 | 4 | 80 | | 1.9 | 4 | 90 |
| 20 | 14 | 150 | 6 | 85 | Film obtained by casting | 1.9 | 3.5 | 97 |

The water transfer of the membrane of Example 5 is 6 and that of the membrane of Example 19 is 12.2.

The membranes of Examples 13 and 19 were in addition tested for their resistance to alkaline reagents by immersing them for 24 hours at 20° C. in a normal aqueous solution of potassium hydroxide. Their substitution resistance and their selective permeability were not affected by this treatment.

All the membranes obtained in these 20 Examples have good mechanical properties, are flexible even in the dry state, show no adhesive ability and are insoluble in water and common solvents.

I claim:

1. A cation exchange membrane which comprises a copolymer of the formula:

$$(-CH_2-CH_2-)_n(-CH_2-\underset{SO_4H}{CH}-)_m(-CH_2-CHOH-)_p(-CH_2-\underset{O-CO-R}{CH}-)_q$$

wherein R is a hydrogen atom or a methyl, ethyl, propyl, hexadecyl, phenyl, cyclohexyl, isopropyl, pentadecyl, tridecyl, phenylmethyl, naphthyl, 1,2,2,3-tetramethylpentyl, vinyl or chloromethyl radical, n, m and p are positive integers and q is a positive integer or 0 and $n/m+p$ is 4.5 to 60 and $q/m+p+q$ is less than 0.1.

2. A membrane according to claim 1 wherein $n/m+p$ is 5.5 to 18.

3. A membrane according to claim 1 wherein $q/m+p+q$ is less than 0.04.

4. A membrane according to claim 1 wherein the copolymer contains 0.5 to 4 milliequivalents of $-SO_4H$ groups per gram of dry membrane.

5. A membrane according to claim 1 which also comprises a reinforcing support.

* * * * *